(12) United States Patent
Isaac et al.

(10) Patent No.: US 11,745,950 B2
(45) Date of Patent: Sep. 5, 2023

(54) VARIABLE CROSS-SECTION COMBINE FEEDER SLAT

(71) Applicant: CNH Industrial America LLC, New Holland, PA (US)

(72) Inventors: Nathan E. Isaac, Lancaster, PA (US); Cale Boriack, Lititz, PA (US); Trevor Book, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/895,213

(22) Filed: Aug. 25, 2022

(65) Prior Publication Data

US 2022/0402702 A1 Dec. 22, 2022

Related U.S. Application Data

(63) Continuation of application No. 16/778,875, filed on Jan. 31, 2020, now Pat. No. 11,447,341.

(51) Int. Cl.
| | |
|---|---|
| *B65G 17/32* | (2006.01) |
| *B65G 15/44* | (2006.01) |
| *B65G 17/06* | (2006.01) |
| *B65G 19/10* | (2006.01) |
| *A01D 61/04* | (2006.01) |

(52) U.S. Cl.
CPC ............. *B65G 17/32* (2013.01); *A01D 61/04* (2013.01)

(58) Field of Classification Search
CPC ........ B65G 15/44; B65G 17/06; B65G 17/32; B65G 19/10; A01D 61/04
USPC .......................................... 410/114; 198/698
See application file for complete search history.

(56) References Cited

U.S. PATENT DOCUMENTS

| | | | |
|---|---|---|---|
| 7,473,168 B2 | 1/2009 | Day et al. | |
| 8,701,870 B1 | 4/2014 | Farley et al. | |
| 9,656,809 B1 | 5/2017 | Bradshaw et al. | |
| 9,717,182 B2 | 8/2017 | Rittershofer et al. | |
| D810,791 S | 2/2018 | Coppinger et al. | |
| 10,070,587 B2 | 9/2018 | Saraiva et al. | |
| (Continued) | | | |

FOREIGN PATENT DOCUMENTS

| | | |
|---|---|---|
| AU | 2006203464 A1 | 4/2007 |
| EP | 3339216 A1 | 6/2018 |

OTHER PUBLICATIONS

Extended European Search Report for EP Application No. 21154355.8 dated Jul. 6, 2021 (seven pages).

*Primary Examiner* — Douglas A Hess
(74) *Attorney, Agent, or Firm* — Peter Zacharias

(57) ABSTRACT

A combine feeder slat having a first base, a second base, and a slat body. The bases are located at respective ends of the slat, and have respective upper and lower surfaces. The slat body extends longitudinally and connects the bases. The slat body has a variable profile as viewed along the longitudinal direction, that transitions from a first profile shape at the first base, to an intermediate profile shape between the first base and the second base, to a second profile shape at the second base. The intermediate profile shape includes a front lip, a rear lip, and an upward-facing concave projection that connects the front lip to the rear lip and extends below an attachment plane defined between the first lower surface and the second lower surface. The first base, second base, and slat body are made from a unitary metal part.

22 Claims, 4 Drawing Sheets

(56) References Cited

U.S. PATENT DOCUMENTS

| | | |
|---|---|---|
| 10,455,766 B2 | 10/2019 | Linde et al. |
| 10,653,066 B2 | 5/2020 | Peters et al. |
| 11,089,729 B2 | 8/2021 | Walker |
| 11,447,341 B2 * | 9/2022 | Isaac ..................... B65G 19/10 |

* cited by examiner

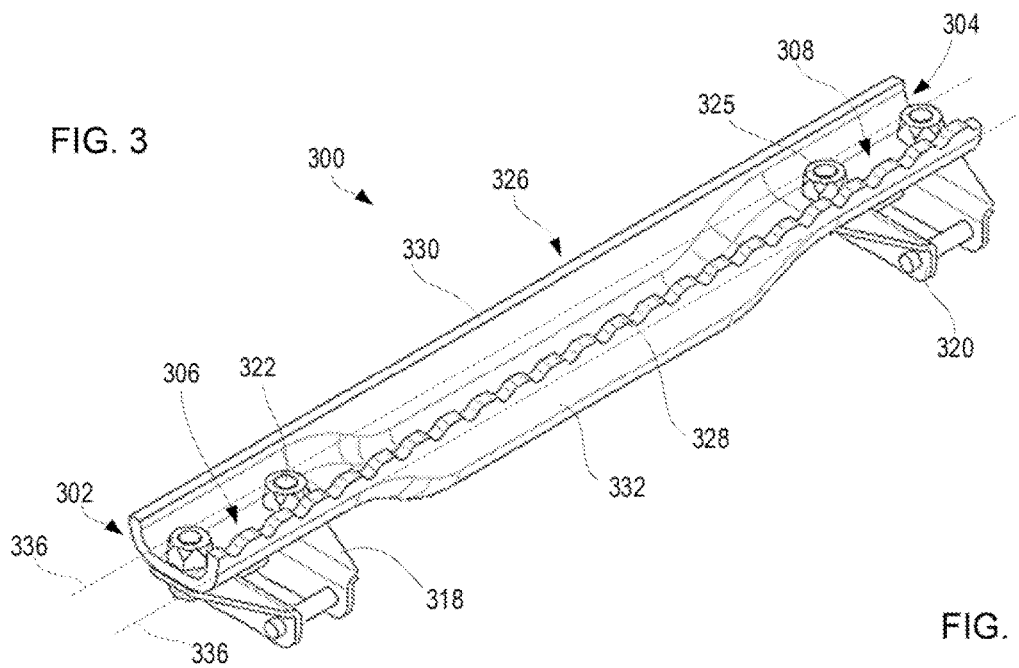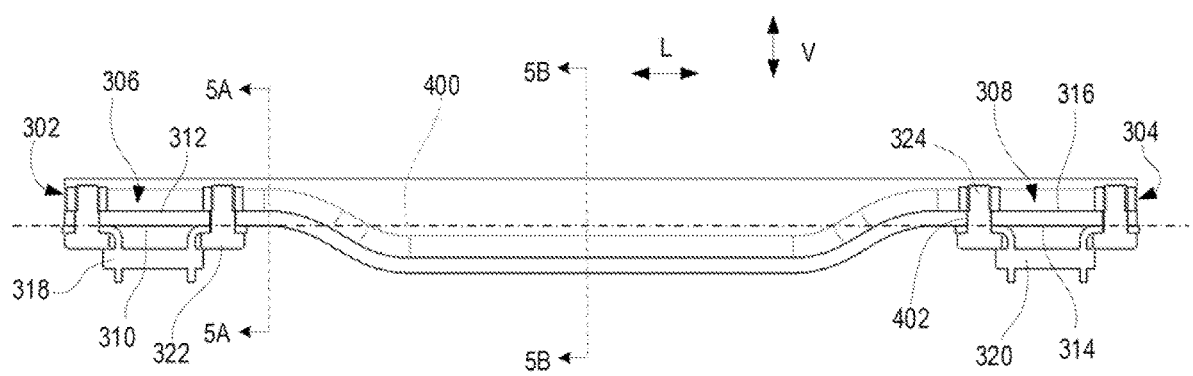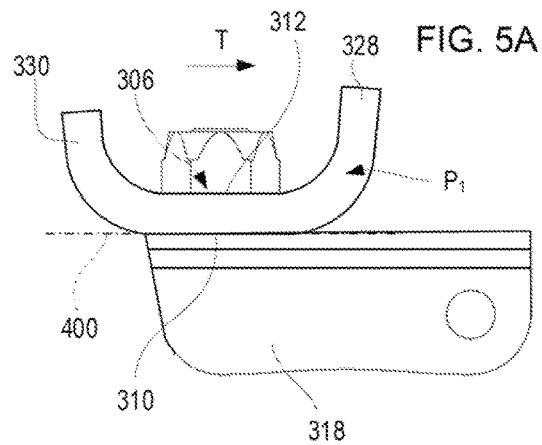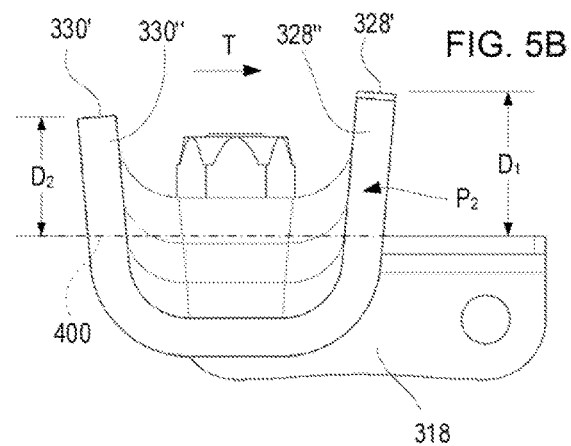

VARIABLE CROSS-SECTION COMBINE FEEDER SLAT

BACKGROUND OF THE INVENTION

Agricultural combines are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of materials from the ground, and moves them towards the feeder. The feeder conveys the consolidated crop materials to the threshing and separating system, which separates the desirable crop from the remaining material.

A typical feeder includes a conveyor system that must move all of the crop material that passes through the combine. Thus, the feeder assembly usually has chains or belts that drive slats to move the crop material. The crop material can have various different shapes, sizes and other physical properties, can be dense and heavy, and can enter the feeder assembly in a variety of different orientations. Furthermore, the crop material can become entangled with the slats, or be caught between the slats and surrounding structures, such as a feeder housing that surrounds the conveyor system.

Efforts have been made to make feeder slats that are economical to produce and have beneficial geometries for efficiently and effectively moving the crop material. A typical feeder slat comprises a sheet of metal that is formed (e.g., folded) to have a Z-shaped, U-shaped or L-shaped profile along the length of the slat. Another typical feeder slat comprises a cast metal part. Cast slats can have a more complex profile shape than a simple formed sheet metal slat, and the profile can change shape at different locations along the length of the slat. For example, it is known to make a cast slat with an a H-shaped or h-shaped cross-section at the longitudinal center of the slat. In still other cases, a slat may be made by more complex forming processes, such as welding multiple pieces of sheet metal or the like.

This description of the background is provided to assist with an understanding of the following explanations of exemplary embodiments, and is not an admission that any or all of this background information is necessarily prior art.

SUMMARY OF THE INVENTION

In one exemplary embodiment, there is provided a combine feeder slat having a first base, a second base, and a slat body. The first base is located at a first end of the feeder slat, and has a first lower surface and a first upper surface opposite the first lower surface. The first base is configured to mount to a first conveyor strand with the first lower surface facing the first conveyor strand. The second base is located at a second end of the feeder slat, and has a second lower surface and a second upper surface opposite the second lower surface. The second base is configured to mount to a second conveyor strand with the second lower surface facing the second conveyor strand. The slat body extends in a longitudinal direction and connects the first base to the second base. The slat body has a variable profile as viewed along the longitudinal direction, that transitions from a first profile shape at the first base, to an intermediate profile shape between the first base and the second base, to a second profile shape at the second base. The intermediate profile shape has a front lip, a rear lip, and an upward-facing concave projection that connects the front lip to the rear lip and extends below an attachment plane defined between the first lower surface and the second lower surface. The first base, second base, and slat body comprise a unitary wrought metal part.

In some exemplary aspects, the intermediate profile shape comprises a U shape, a V shape or a W shape.

In some exemplary aspects, the first profile shape is the same as the second profile shape.

In some exemplary aspects, the front lip and the rear lip are located above the attachment plane. The first lip and the second lip may extend from the first end of the feeder slat to the second end of the feeder slat. The first profile shape may comprise a first upward-facing concave U shape formed by the first base, the front lip and the rear lip, and the second profile shape may comprise a second upward-facing concave U shape formed by the second base, the front lip and the rear lip, and the upward facing concave projection of the intermediate profile shape may be deeper in a vertical direction than the first upward-facing concave U shape and the second upward-facing concave U shape.

In some exemplary aspects, one or both of the front lip and the rear lip is serrated.

In some exemplary aspects, a respective distal edge of the front lip is located a first vertical distance from the attachment plane, and a respective distal edge of the rear lip is located a second vertical distance from the attachment plane, and the first vertical distance is greater than the second vertical distance.

In some exemplary aspects, a respective distal edge of the front lip is located a first vertical distance from the attachment plane, and a respective distal edge of the rear lip is located a second vertical distance from the attachment plane, and the first vertical distance is less than the second vertical distance.

In some exemplary aspects, the front lip comprises a front wall that is angled away from the rear lip.

In some exemplary aspects, the rear lip comprise a rear wall that is angled away from the front lip.

In some exemplary aspects, the first base comprises one or more holes configured to receive fasteners to secure the first base to the first conveyor strand, and the second base comprises one or more holes configured to receive fasteners to secure the second base to the second conveyor strand.

In another exemplary aspect, there is provide a method for forming a feeder slat as describe in the first exemplary aspect. The method includes forming the first base, the second base and the slat body from a unitary wrought metal part.

In some exemplary aspects, forming the first base and the second base comprises folding a single wrought metal sheet at a first fold line that extends along the longitudinal direction, to form a folded profile shape having a first portion on a first side of the first fold line comprising the first base and the second base, and a second portion on a second side of the first fold line comprising the front lip or the rear lip.

In some exemplary aspects, forming the first base and the second base comprises folding a single wrought metal sheet at a first fold line that extends along the longitudinal direction and at a second fold line that extends along the longitudinal direction, to form a folded profile shape having a first portion comprising the first base and the second base, a second portion extending from the first portion at the first fold line and comprising the front lip, and a third portion extending from the first portion at the second fold line and comprising the rear lip.

In some exemplary aspects, forming the slat body comprises holding the folded profile shape at the first base and the second base, and plastically deforming a portion of the single wrought metal sheet into the upward-facing concave projection.

In some exemplary aspects, forming the first base, the second base, and the slat body comprises applying hydraulic pressure to the inside of a tubular wrought metal blank.

In some exemplary aspects, the first base, second base, and slat body may be formed by flexible roll-forming or a single stamping operation.

In a third exemplary aspect, there is provided an agricultural combine harvester having a chassis configured for moving on a surface, and a feeder housing attached to the chassis. The feeder housing has at least two conveyor strands and a plurality of feeder slats as described in relation to the first exemplary aspect connected between the at least two conveyor strands.

BRIEF DESCRIPTION OF THE DRAWINGS

Embodiments of inventions will now be described, strictly by way of example, with reference to the accompanying drawings, in which:

FIG. 3 is an isometric view of an exemplary feeder slat.

FIG. 4 is a cross-sectional front elevation view of the feeder slat of FIG. 3.

FIG. 5A is a cross-sectional side elevation view of the feeder slat of FIG. 4, shown from line 5A-5A.

FIG. 5B is a cross-sectional side elevation view of the feeder slat of FIG. 4, shown from line 5B-5B.

In the figures, like reference numerals refer to the same or similar elements.

DETAILED DESCRIPTION OF THE DRAWINGS

The terms "crop" and "crop material" are used to describe any mixture of grain, seeds, straw, tailings, and the like. "Grain" or "seeds" refer to that part of the crop material which is threshed and separated from the discardable part of the crop material (e.g., straw and tailings), and includes grain in aggregate form such as an ear of corn. The portion of the crop material that generally is discarded or not used for food or growing purposes may be referred to as non-grain crop material, material other than grain (MOG) or straw.

Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1:
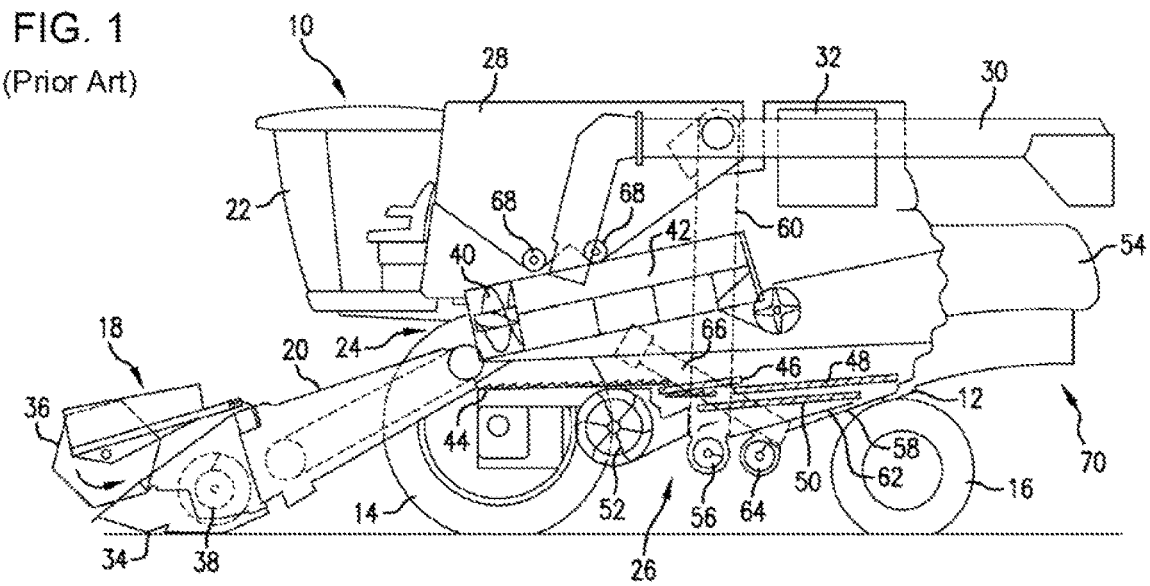
FIG. 1 schematically illustrates a prior art agricultural combine.

Referring to FIG. 1, there is shown an example of a known agricultural harvester in the form of a combine 10, which generally includes a chassis 12, ground engaging wheels 14 and 16, a header 18, a feeder assembly 20, an operator cab 22, a threshing and separating system 24, a grain cleaning system 26, a grain tank 28, and an unloading auger 30. The operative components of the combine 10 are powered by a power plant in the form of a diesel engine 32 or the like.

It should be appreciated that while the agricultural harvester is shown as a combine 10, exemplary embodiments may be used with other equipment that harvests crop material (e.g., conventional combines, rotary combines, hybrid combines, chopper harvesters, etc.), or the like.

A header 18 is mounted to the front of the combine 10 and includes a cutter bar 34 for severing crops from a field during forward motion of the combine 10. A rotatable reel 36 may be provided to feed the crop into the header 18, and augers 38 or conveyor belts feed the severed crop laterally inwardly from each side of the header toward the feeder assembly 20. The feeder assembly 20 conveys the cut crop to the threshing and separating system 24, and may be movable using appropriate actuators, such as hydraulic cylinders (not shown) to change the height and/or tilt if the header 18 relative to the chassis 12 and the ground.

The threshing and separating system 24 in the shown exemplary embodiment is of the axial-flow type, which is longitudinally oriented in the chassis 12 and includes a rotor 40 at least partially enclosed by and rotatable within a corresponding perforated concave 42. The cut crops are threshed and separated by the rotation of the rotor 40 and moved in an axially rearward direction within the concave 42. Larger elements, such as stalks, leaves and the like are discharged from the rear of combine 10. Smaller elements of crop material, including grain and MOG, are discharged through perforations of concave 42. The MOG typically includes particles that are lighter than the grain, such as chaff, dust and straw, but some heavier-than-grain particles also may be included.

Grain and MOG that has been separated by the rotor 40 and the perforated concaves 42 falls onto a main conveyance apparatus 44, which conveys the material toward the grain cleaning system 26. The grain cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52, which provides airflow through the sieves to remove chaff and other impurities such as dust from the grain, by making this material airborne for discharge from a straw hood 54 located at the back of the combine 10.

Clean grain falls to a clean grain auger 56 positioned crosswise below and in front of the lower sieve 50. The clean grain auger 56 receives clean grain from each sieve 48, 50 and from a bottom pan 62 of the grain cleaning system 26. The clean grain auger 56 conveys the clean grain laterally to a generally vertically arranged elevator 60, which can also be referred to as a grain elevator, for transport to the grain tank 28.

Tailings from the grain cleaning system 26 that fall down to a lower bottom pan 58 move to a tailings auger 64. The tailings are transported via tailings auger 64 and a return auger 66 to the upstream end of the grain cleaning system 26 for repeated cleaning action.

A pair of grain tank augers 68 at the bottom of the grain tank 28 convey the clean grain laterally within the grain tank 28 to the unloading auger 30 for discharge from the combine 10. The non-grain crop material proceeds through a residue handling system 70. Residue handling system 70 may include a chopper, counter knives, a windrow door, a residue spreader, and other features known in the art.

Figure 2:
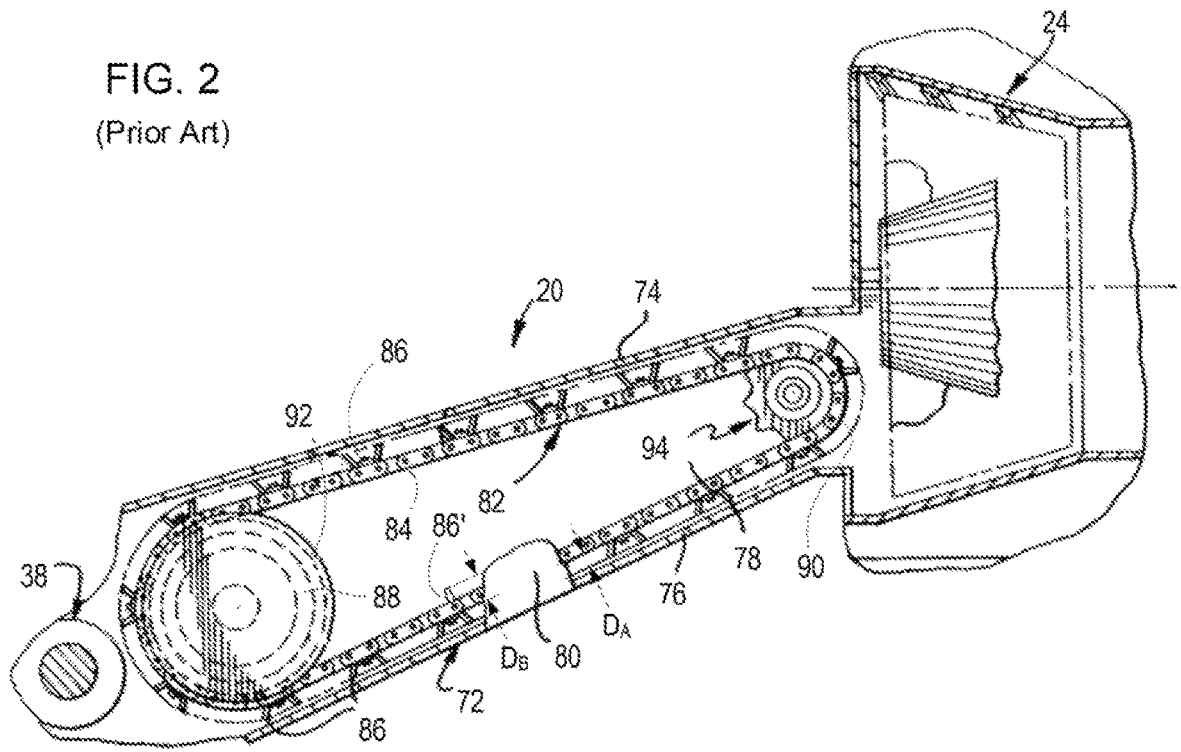
FIG. 2 is a partially cutaway side view of a prior art feeder assembly and adjacent portions of an agricultural combine.

In a typical combine 10, the entire bulk of the incoming crop material passes through the feeder assembly 20. FIG. 2 illustrates a typical prior art feeder assembly 20 in more detail. The feeder assembly 20 includes a feeder housing 72 having a top wall 74, a bottom wall 76 opposite the top wall 74, a first side wall 78 and a second side wall 80. Together, the walls form a passage extending from a front opening facing the header 18 (e.g., at the central location between the augers 38 or lateral conveyor belts), to a rear opening facing the threshing and separating system 24. The rear end of the feeder housing 72 may be rigidly joined to the vehicle frame, or joined by a pivot or other movable joint, as known in the art.

Inside the feeder housing 72 is a conveyor assembly 82 formed by multiple laterally displaced endless chains 84 (only one chain 84 is visible in this side view), belts, or other types of conveyor strands. A plurality of feeder slats 86 extend laterally from one chain 84 to the next. The chains 84 wrap around a front chain support 88 located adjacent the header 18, and a rear chain support 90 located adjacent the threshing and separating system 24. Additional supports may be provided at other locations. The chain supports 88, 90 may comprises single structures for all of the chains 84 or separate structures for each individual chain 84. For example, the front chain support 88 may comprise a series of wheels that are interconnected by an elongated tubular shaft known as a feeder drum 92, to support each chain 84 at the proper lateral position. The feeder drum 92 establishes a generally uniform gap between the feeder drum 92 and the lower wall 76 of the housing 72, which may be helpful to regulate and distribute crop intake.

One or more interconnected drive sprockets 94 are provided to apply a motive force to move the chains 84. Such movement causes the slats 86 on one side of the conveyor assembly 82 to move in a first direction from the header 18 towards the threshing and separating system 24 (the delivery path), and the slats 86 on the other side of the conveyor assembly 82 to move in a second direction from the threshing and separating system 24 towards the header 18 (the return path). Devices in which the lower span of the conveyor assembly 82 moves in the delivery path direction are sometimes called "over slung" machines, and devices in which the upper span of the conveyor assembly 82 moves in the delivery path direction are sometimes called "under slung" machines.

A typical feeder slat 86 is attached to a chain 84 at each end of the feeder slat 86. To make it easier to remove and replace the feeder slats 84, the feeder slats 86 typically are mounted to the outer faces of the chains 84—that is, the side of the chain opposite the drive sprockets 94 and support 88. To this end, each end of the feeder slat 86 comprises a base region that is shaped to rest against the outer face of the respective chain 84. Fastener, such as screws or bolts, are used to attach the base regions to the chains 84.

When the feeder slat 86 is installed, its base regions are positioned against the chains 84 and at the outer perimeter of each chain's path. Also, portions of the feeder slat 86 typically extend above the base regions, and towards the adjacent wall of the feeder housing 72. As used herein in relation to feeder slat dimensions, the term "above" means above the attachment plane of the feeder slat 86 (i.e., a direction extending away from the space defined within the travel path of the chain 84). For example, in FIG. 2, which is an over slung machine, the feeder slats 86 extend a distance $D_A$ above the chain 84, and towards the lower wall 76 of the housing 72. A portion of the feeder slat 86 also may extend below the base regions, to be within the path of the chains 84. As used herein in relation to feeder slat dimensions, the term "below" means below the attachment plane of the feeder slat 86 (i.e., a direction extending into the space defined within the travel path of the chain 84). For example, in FIG. 2, one feeder slat 86' has a portion 96 that extends below its base region by distance $D_B$.

In many cases, it is desirable for the feeder slat 86 to extend both above and below the chain 84. This increases the area of the slat 86 that is effective for pushing the crop material along the feeder housing 72, and increases the bending resistance of the slat. For example, a sheet metal slat may be formed by folding to have edges that extend both above and below the chain 84, or a slat may be cast in a mold that yields a profile that extends in both directions. However, formed sheet metal slats are limited to having a uniform profile shape that can be relatively weak and subject to bending or other deformation over time. Also when a sheet metal slat does deform, it can reduce crop conveying efficiency, and potentially damage the conveyor strands. Casting allows more flexibility in creating a complex profile, but cast slats typically are heavier than a formed sheet metal slat. Furthermore, cast metal can be relatively brittle, leading to an increased likelihood of fracturing during impact loading with objects that might be included in the crop material. Welding a slat together from multiple pieces of sheet metal or the like is another option to create more complex slat shapes, but also adds significant cost.

The inventors have determined that the shape of a feeder slat can be improved by making the feeder slat from formed sheet metal that has a varying profile along the length of the slat. This construction is expected to obtain the benefits of sheet metal's toughness, and a complex cast profile's bending stiffness, without inheriting the weaknesses (at least to the same degree) of either type of construction.

Referring now to FIGS. 3 through 5, a first example of a feeder slat 300 is shown and described in detail. The feeder slat 300 extends in a longitudinal direction L from a first end 302 to a second end 304. A first mounting base 306 is located at the first end 302, and a second mounting base 308 is located at the second end 304. As best seen in FIG. 4, the first base 306 has a first lower surface 310, and a first upper surface 312 opposite the first lower surface 310. Similarly, the second base 308 has a second lower surface 314 and a second upper surface 316 opposite the second lower surface 314.

Figure 6:
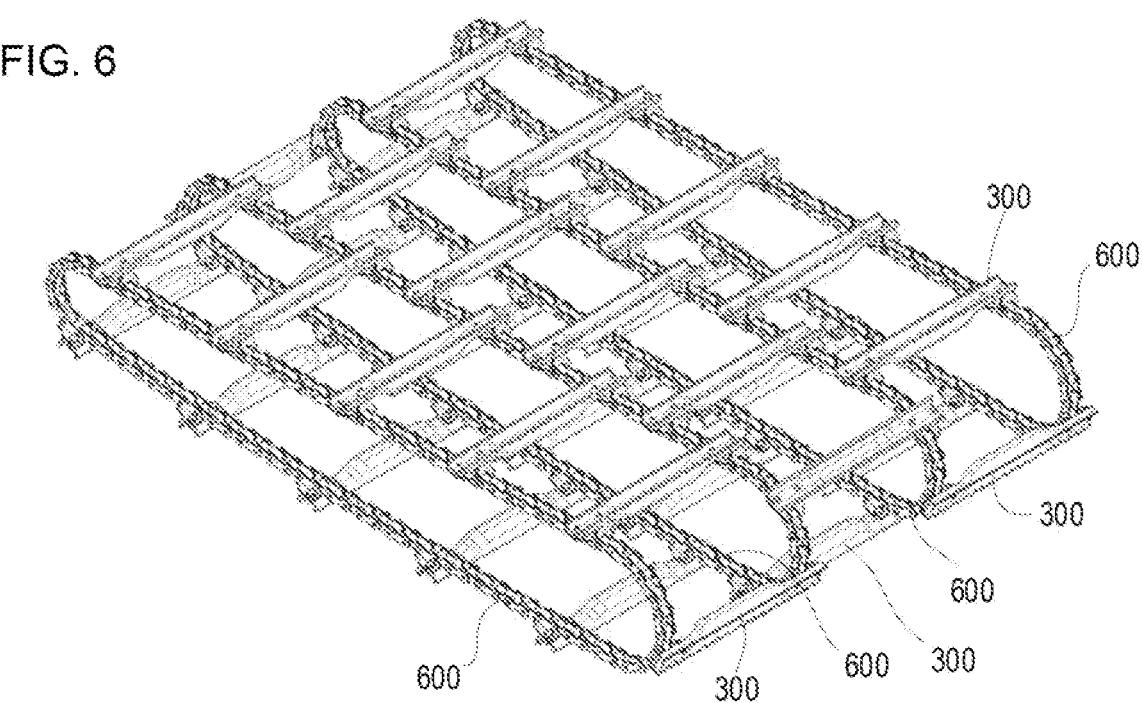
FIG. 6 is an isometric view of a feeder conveyor assembly including the feeder slat of FIG. 3.

The first lower surface 310 and the second lower surface 314 are each configured to attach to a respective strand 600 of a feeder housing conveyor, such as shown in FIG. 6. The strands 600 may comprise belts, chains, cables, or the like. In the shown example, the strands 600 comprise chains. In this example, the first lower surface 310 and the second lower surface 314 are attached to a respective first link 318 and second link 320 of a respective chain. The attachment may be direct (i.e., face-to-face without intervening parts) or indirect (e.g., attached with washers or the like between the surfaces of the feeder slat 300 and the links 318, 320). Any suitable connector, such as the shown bolts and nuts, may be used to connect the feeder slat 300 to the links 318, 320. For example, each of the first base 306 and the second base 308 may comprise one or more holes 402 to allow the fasteners to pass through.

As best seen in FIG. 4, an attachment plane 400 is defined between the first lower surface 310 and the second lower surface 314. The attachment plane extends from the inner connection points between the first lower surfaces 310 and the second lower surface 314 and their respective chains. In this example, these inner connection points are at the two closest bolt connections 322, 324. The portions of the first lower surface 310 and the second lower surface 314 located outside the inner connection points may extend along the attachment plane 400, but this is not strictly necessary.

The feeder slat 300 also includes a slat body 326 that extends in the longitudinal direction L and connects the first base 306 to the second base 308. As shown in FIGS. 5A and 5B, the slat body 300 has a variable profile as viewed along the longitudinal direction L. The profile transitions from a first profile shape $P_1$ at the first base 306, to an intermediate profile shape $P_2$ at an intermediate location between the first base 306 and the second base 308, and to a second profile shape at the second base 306. In this example, the second profile shape is identical to the first profile shape $P_1$, but this is not required in all cases.

The intermediate profile shape $P_2$ includes a front lip 328, a rear lip 330, and an upward-facing concave projection 332 that connects the front lip 328 to the rear lip 330. The projection 332 may have any shape that has a concave surface facing in the upwards direction (i.e., in a direction away from the first and second lower surfaces 310, 314). In this example, the projection has a C shape, such as shown in FIG. 5B. The lower surface of the projection 332 extends between the first lower surface 310 and the second lower surface 314, and below the attachment plane 400. In the shown example, the lower surface of the projection 332 is formed with a smooth continuous curve at each end that transitions into the adjacent first lower surface 310 and second lower surface 314, but other transition shapes (e.g., stepped) may be used. Thus, when the feeder slat 300 is installed on a feeder housing conveyor assembly, the projection 332 will extend below the base regions, to be within the path of the conveyors.

The front lip 328 is intended to be located in front of the rear lip 330 with respect to the travel direction T of the feeder slat 300. At least one of the front lip 328 and the rear lip 330 preferably is located above the attachment plane 400, and thus is positioned outside the path of the feeder conveyor. The entire length, or only a portion, of the lip 328, 330 may be above the attachment plane 400.

At least one of the front lip 328 and the rear lip 330 also preferably extends across one or both of the first base 306 and the second base 308. In this case, the front lip 328 or rear lip 330 preferably is formed unitarily with the respective base 306, 308 to provide a continuous profile shape. In the shown example, both lips 328, 330 extend along the entire length of the feeder slat 300 (i.e., from the first end 302 to the second end 304), and each lip 328, 330 is located above the attachment plane 400 along its entire length. Thus, the first profile shape $P_1$, the intermediate profile shape $P_2$ and the second profile shape all comprise respective upward-facing concave U shaped projections formed by the first base 306, the front lip 328 and the rear lip 330. However, the upward-facing concave projection has a deeper profile in the vertical direction V. This configuration is expected to provide a relatively strong profile shape along the entire length of the feeder slat 300, with increased stiffness at the intermediate region to resist bending in the vertical direction V that might deform a conventional feeder slat having a uniform profile shape.

The front lip 328 and/or rear lip 330 may be straight, serrated, or have other shapes. In the shown example, the front lip 328 is serrated, and the rear lip 330 is straight. If the feeder slat 300 is reversed on the feeder housing conveyor, however, the lips will change positions, and so the nominal front lip 328 would be operated as a serrated rear lip, and the nominal rear lip 330 would be operated as a straight front lip. In other cases, both lips 328, 330 may be serrated, or both may be straight, or other combinations of other shapes may be used.

The heights of the front and rear lips 328, 330 also may vary. For example, the distal edge 328' of the front lip 328 may be located a first vertical distance $D_1$ from the attachment plane 400 and the distal edge 330' of the rear lip 330 may be located a second vertical distance $D_2$ from the attachment plane 400, as shown in FIG. 5B. The first vertical distance $D_1$ may be less than, equal to, or greater than the second vertical distance $D_2$. Similarly, the front lip 328 and/or rear lip 330 may be oriented at any suitable angle relative to each other. In this case, the front lip 328 comprises a front wall 328" that is angled away from the rear lip 330, and the rear lip 330 comprises a rear wall 330" that is angled away from the front lip 328. Alternatively, the front lip 328 and rear lip 330 may be parallel to each other, which may be preferable to provide increased bending stiffness and/or buckling resistance. Other alternatives and variations will be apparent to persons of ordinary skill in the art in view of the present disclosure.

The exemplary feeder slat 300 may be formed by a number of different methods. Preferably, the feeder slat 300 comprises a single unitary piece of wrought metal, such as a sheet of steel, that is formed by bending, stamping, hydroforming or the like to achieve the final variable-profile shape. For example, the feeder slat 300 may comprise a flat piece of sheet metal that is bent at two fold lines 336 to form the first base 306 and second base 308 between the fold line 336, and the first and second lips 328, 330 on the other sides of respective ones of the fold lines 336. Subsequently, the part is held in place at each end, such as by placing the first base 306 and second base 308 into respective grips, and pressure is applied to the slat body 326 to plastically deform the metal by drawing it into a deeper C shaped profile. Pressure may be applied by a stamp and die or the like. In another case, only a single one of the lips 328, 330 may be formed by folding before plastically deforming the slat body 326 to form the deeper profile, or the slat body 326 may be deformed in a flat sheet between the fold lines 336 before folding the sheet to form the front lip 328 and rear lip 330.

In another embodiment, the feeder slat 300 may be formed from a tube of wrought metal, such as square, round or rectangular tubular steel. For example, the tube may be placed into a hydroforming chamber having the desired net final shape or a near-net final shape, and hydraulic pressure may be applied internally to the tube by a hydraulic fluid or the like to deform the tubular blank to match or approximate the shape of the hydroforming chamber. After hydroforming, a portion of the formed tube may be cut away to leave only the desired portion as the formed feeder slat 300. It is also envisioned that two (or more) feeder slats may be simultaneously hydroformed in a chamber having mirror-image feeder slat shapes formed in opposite walls. In this case, the formed blank can be cut along the center to release two formed feeder slats.

Other methods for forming the feeder slat from wrought metal may also be used. For example, the entire feeder slat may be formed from a flat sheet of metal in a single stamping operation. Flexible roll-forming also may be used to continuously roll form a sheet into the different desired profile shapes. In any case, the resulting feeder slat 300 comprises the molecular structure of a wrought metal part, rather than a cast metal part. Thus, the feeder slat 300 is expected to have greater toughness and fatigue life than a cast metal part, and potentially less weight than a cast metal part having the same stiffness in the vertical direction V.

Figure 7:
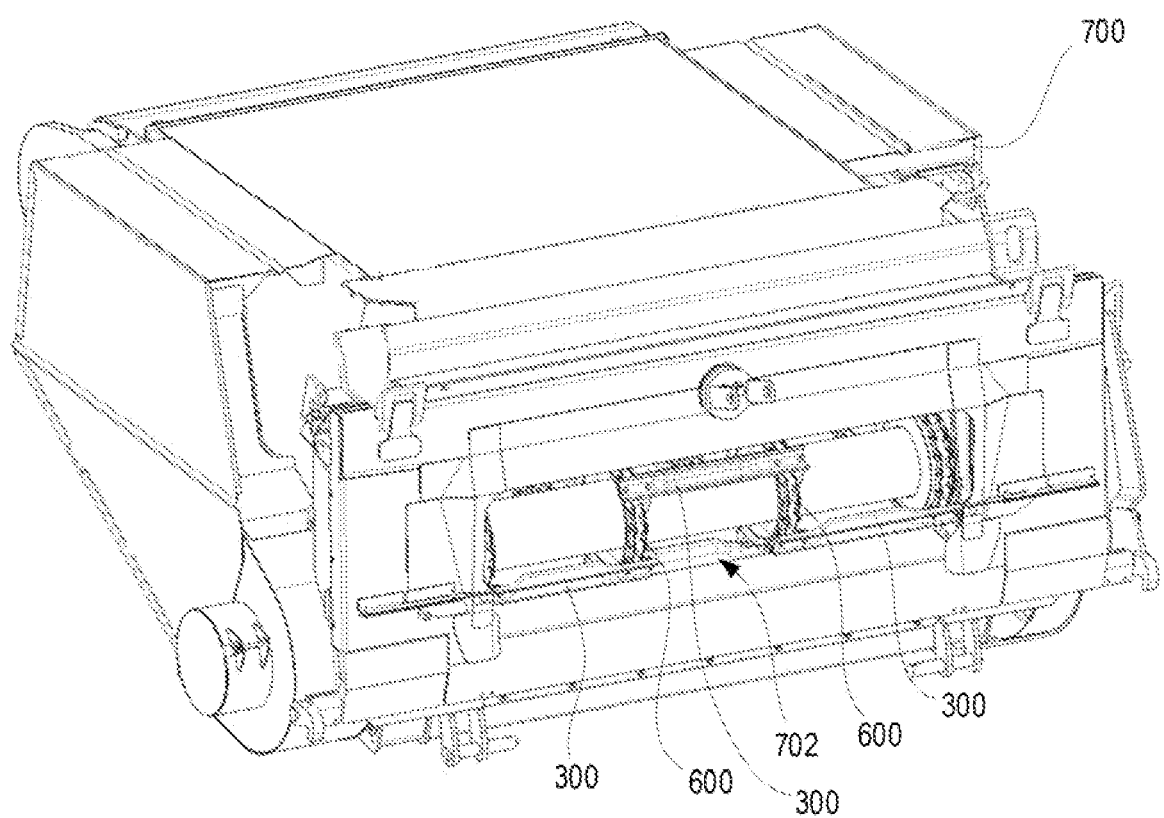
FIG. 7 is an isometric view of a feeder housing including the feeder conveyor assembly of FIG. 6.

FIGS. 6 and 7 illustrate how the feeder slat 300 may be integrated into a combine harvesting system. As shown in FIG. 6, a plurality of feeder slats 300 may be connected to respective feeder strands 600, such as chains, belts or cables. In this case, there are four chains, with three rows of feeder slats 300. Other examples may use as few as two feeder strands 600, or more than four feeder strands 600, depending on the desired application and other operating requirements. As shown in FIG. 7, the feeder strands 600 and feeder slats 300 are mounted inside a feeder housing 700 having an opening 702 to receive incoming crop material, and an outlet (not visible) through which the crop material exits the feeder housing 700. Any suitable drive sprockets, gears, rollers, supports or the like may be provided in the feeder housing 700, as known in the art.

Figure 8:
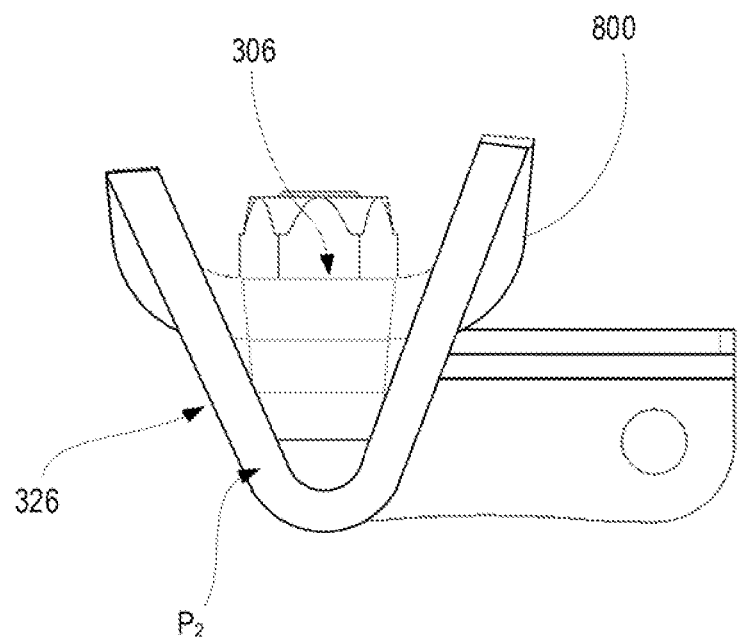
FIG. 8 is a cross-sectional side elevation view of another exemplary feeder slat, shown along a longitudinal center of the feeder slat.
Figure 9:
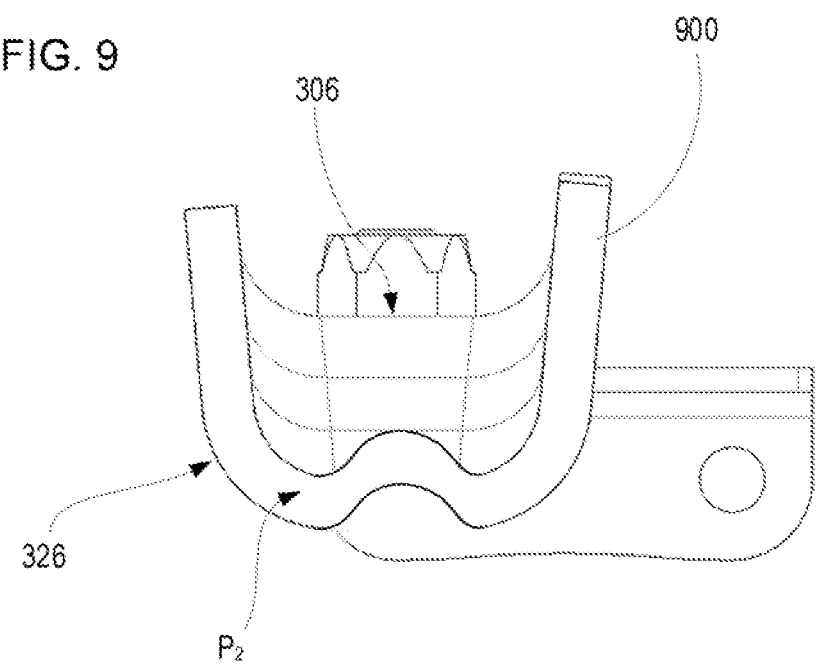
FIG. 9 is a cross-sectional side elevation view of another exemplary feeder slat, shown along a longitudinal center of the feeder slat.

It will also be appreciated that wrought metal feeder slats also may be formed with variable profile shapes other than the exemplary U shape. For example, FIG. 8 shows a feeder slat 800 that transitions from a U shaped first profile $P_1$ at the base 306, to a V shaped intermediate profile $P_2$ along the feeder slat body 326. As another example, FIG. 9 shows a feeder slat 900 that transitions from a U shaped first profile $P_1$ at the base 306, to a W shaped intermediate profile $P_2$ along the feeder slat body 326. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A combine feeder slat comprising:
   a first base located at a first end of the feeder slat, the first base having a first lower surface and a first upper surface opposite the first lower surface, the first base being configured to mount to a first conveyor strand with the first lower surface facing the first conveyor strand;
   a second base located at a second end of the feeder slat, the second base having a second lower surface and a second upper surface opposite the second lower surface, the second base being configured to mount to a second conveyor strand with the second lower surface facing the second conveyor strand; and
   a slat body extending in a longitudinal direction and connecting the first base to the second base, the slat body comprising a variable profile as viewed along the longitudinal direction, that transitions from a first profile shape at the first base, to an intermediate profile shape between the first base and the second base, to a second profile shape at the second base, the intermediate profile shape comprising a front lip, a rear lip, and an upward-facing concave projection that connects the front lip to the rear lip, wherein the upward-facing concave projection defines an open volume and at least a portion of the open volume extends below an attachment plane defined between the first lower surface and the second lower surface,
   wherein the first base, second base, and slat body comprise a unitary metal part.

2. The combine feeder slat of claim 1, wherein the intermediate profile shape comprises a U shape.

3. The combine feeder slat of claim 1, wherein the intermediate profile shape comprises a V shape.

4. The combine feeder slat of claim 1, wherein the intermediate profile shape comprises a W shape.

5. The combine feeder slat of claim 1, wherein the first profile shape is the same as the second profile shape.

6. The combine feeder slat of claim 1, wherein the front lip and the rear lip are located above the attachment plane.

7. The combine feeder slat of claim 6, wherein the first lip and the second lip extend from the first end of the feeder slat to the second end of the feeder slat.

8. The combine feeder slat of claim 7, wherein:
   the first profile shape comprises a first upward-facing concave U shape formed by the first base, the front lip and the rear lip;
   the second profile shape comprises a second upward-facing concave U shape formed by the second base, the front lip and the rear lip; and
   the upward facing concave projection of the intermediate profile shape is deeper in a vertical direction than the first upward-facing concave U shape and the second upward-facing concave U shape.

9. The combine feeder slat of claim 1, wherein one or both of the front lip and the rear lip is serrated.

10. The combine feeder slat of claim 1, wherein a respective distal edge of the front lip is located a first vertical distance from the attachment plane, and a respective distal edge of the rear lip is located a second vertical distance from the attachment plane, and the first vertical distance is greater than the second vertical distance.

11. The combine feeder slat of claim 1, wherein a respective distal edge of the front lip is located a first vertical distance from the attachment plane, and a respective distal edge of the rear lip is located a second vertical distance from the attachment plane, and the first vertical distance is less than the second vertical distance.

12. The combine feeder slat of claim 1, wherein the front lip comprises a front wall that is angled away from the rear lip.

13. The combine feeder slat of claim 1, wherein the rear lip comprise a rear wall that is angled away from the front lip.

14. The combine feeder slat of claim 1, wherein the first base comprises one or more holes configured to receive fasteners to secure the first base to the first conveyor strand, and the second base comprises one or more holes configured to receive fasteners to secure the second base to the second conveyor strand.

15. A method for forming a combine feeder slat, the method comprising:
   forming, from a unitary metal part, a first base located at a first end of the feeder slat, the first base having a first lower surface and a first upper surface opposite the first lower surface, the first base being configured to mount to a first conveyor strand with the first lower surface facing the first conveyor strand;
   forming, from the unitary metal part, a second base located at a second end of the feeder slat, the second base having a second lower surface and a second upper surface opposite the second lower surface, the second base being configured to mount to a second conveyor strand with the second lower surface facing the second conveyor strand; and forming, from the unitary metal part, a slat body extending in a longitudinal direction and connecting the first base to the second base, the slat body comprising a variable profile as viewed along the longitudinal direction, that transitions from a first profile shape at the first base, to an intermediate profile shape between the first base and the second base, to a second profile shape at the second base, the intermediate profile shape comprising a front lip, a rear lip, and an upward-facing concave projection that connects the front lip to the rear lip and extends below an attachment plane defined between the first lower surface and the second lower surface.

16. The method of claim 15, wherein forming the first base and the second base comprises folding a single metal sheet at a first fold line that extends along the longitudinal direction, to form a folded profile shape having a first portion on a first side of the first fold line comprising the first base and the second base, and a second portion on a second side of the first fold line comprising the front lip or the rear lip.

17. The method of claim 15, wherein forming the first base and the second base comprises folding a single metal sheet at a first fold line that extends along the longitudinal direction and at a second fold line that extends along the longitudinal direction, to form a folded profile shape having a first portion comprising the first base and the second base, a second portion extending from the first portion at the first fold line and comprising the front lip, and a third portion extending from the first portion at the second fold line and comprising the rear lip.

18. The method of claim 17, wherein forming the slat body comprises holding the folded profile shape at the first base and the second base, and plastically deforming a portion of the single metal sheet into the upward-facing concave projection.

19. The method of claim 15, wherein forming the first base, the second base, and the slat body comprises applying hydraulic pressure to the inside of a tubular metal blank.

20. The method of claim 15, wherein forming the first base, the second base, and the slat body comprises flexible roll-forming a metal sheet to form the first base, the second base and the slat body.

21. The method of claim 15, wherein forming the first base, the second base, and the slat body comprises stamping a metal sheet to form the first base, the second base and the slat body in a single stamping operation.

22. An agricultural combine harvester comprising:
a chassis configured for moving on a surface; and
a feeder housing attached to the chassis, the feeder housing comprise at least two conveyor strands and a plurality of feeder slats connected between the at least two conveyor strands, one of more of the plurality of feeder slats comprising:
a first base located at a first end of the feeder slat, the first base having a first lower surface and a first upper surface opposite the first lower surface, the first base being configured to mount to a first one of the at least two conveyor strands with the first lower surface facing the first conveyor strand,
a second base located at a second end of the feeder slat, the second base having a second lower surface and a second upper surface opposite the second lower surface, the second base being configured to mount to a second one of the at least two conveyor strands with the second lower surface facing the second conveyor strand, and
a slat body extending in a longitudinal direction and connecting the first base to the second base, the slat body comprising a variable profile as viewed along the longitudinal direction, that transitions from a first profile shape at the first base, to an intermediate profile shape between the first base and the second base, to a second profile shape at the second base, the intermediate profile shape comprising a front lip, a rear lip, and an upward-facing concave projection that connects the front lip to the rear lip, wherein the upward-facing concave projection defines an open volume and at least a portion of the open volume extends below an attachment plane defined between the first lower surface and the second lower surface,
wherein the first base, second base, and slat body comprise a unitary metal part.

* * * * *